United States Patent
Wang et al.

(10) Patent No.: US 7,375,934 B2
(45) Date of Patent: May 20, 2008

(54) POWER CONVERTER CONTROLLING APPARATUS AND METHOD APPLYING A FAULT PROTECTION SCHEME IN A MOTOR DRIVE SYSTEM

(75) Inventors: Zheng Wang, Mississauga (CA); Jack Daming Ma, Mississauga (CA); George You Zhou, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 254 days.

(21) Appl. No.: 10/944,199

(22) Filed: Sep. 20, 2004

(65) Prior Publication Data

US 2006/0061923 A1 Mar. 23, 2006

(51) Int. Cl.
*H02H 5/04* (2006.01)

(52) U.S. Cl. ............................ 361/23; 316/30; 316/31; 316/33; 316/51; 318/432; 318/727; 318/609; 318/610

(58) Field of Classification Search .................. 361/23, 361/51, 52; 318/609, 610, 432, 434, 727; 388/903

See application file for complete search history.

(56) References Cited

U.S. PATENT DOCUMENTS

| | | | |
|---|---|---|---|
| 4,520,300 A | 5/1985 | Fradella | |
| 4,736,146 A | 4/1988 | Bettendorf | |
| 4,814,677 A | 3/1989 | Plunkett | |
| 5,726,881 A * | 3/1998 | Inaniwa et al. | 700/79 |
| 5,994,867 A | 11/1999 | Birk et al. | |
| 6,163,127 A | 12/2000 | Patel et al. | |
| 6,288,514 B1 | 9/2001 | Direnzo et al. | |
| 6,301,136 B1 * | 10/2001 | Huggett et al. | 363/95 |
| 6,324,038 B1 * | 11/2001 | Kishibe et al. | 361/31 |
| 6,483,270 B1 | 11/2002 | Miyazaki et al. | |
| 6,628,099 B2 * | 9/2003 | Iwaji et al. | 318/700 |
| 6,741,060 B2 * | 5/2004 | Krefta et al. | 318/727 |
| 6,949,908 B2 * | 9/2005 | Maslov et al. | 318/727 |
| 6,965,206 B2 * | 11/2005 | Kamen et al. | 318/139 |
| 2003/0052643 A1 | 3/2003 | Sweo | |
| 2003/0081434 A1 | 5/2003 | Kikuchi et al. | |
| 2004/0041530 A1 | 3/2004 | Peterson | |
| 2004/0056661 A1 | 3/2004 | Maeda et al. | |

FOREIGN PATENT DOCUMENTS

JP 06-054584 A 2/1994

* cited by examiner

*Primary Examiner*—Michael Sherry
*Assistant Examiner*—Terrence R. Willoughby
(74) *Attorney, Agent, or Firm*—Oral Caglar, Esq.

(57) ABSTRACT

A method and apparatus control a power converter (20) of a motor drive system. The power converter (20) is controlled during a first operating mode by applying a current control scheme, which sets power converter commands to control active and reactive current components flowing from the power converter (20) to the motor (30) to achieve desired motor speed; and a fault protection scheme is executed during a second operating mode. The fault protection scheme generates power converter commands to reduce the active current component flowing from the power converter (20) to the motor (30) is substantially zero. The first operating mode will be resumed upon receiving the restart command if the motor speed is above a pre-set shutdown threshold.

30 Claims, 5 Drawing Sheets

POWER CONVERTER CONTROLLING APPARATUS AND METHOD APPLYING A FAULT PROTECTION SCHEME IN A MOTOR DRIVE SYSTEM

FIELD OF THE INVENTION

The present invention relates to electrical power conversion, and more particularly to a power converter controller, and a power converter control method, applying a fault protection scheme in a motor drive system.

BACKGROUND OF THE INVENTION

An exemplary motor drive system includes the following main components: a synchronous motor, such as a three-phase permanent magnet synchronous motor (PMSM); a multi-phase power converter; a DC power source; a PWM (Pulse Width Modulation) Generator and switch driver; and a controller. The power converter is typically an inverter that converts DC power from power source into three-phase AC power, e.g., utilizing a configuration of insulated-gate bipolar transistors (IGBTs) under control of the PWM Generator and switch driver (pulse width modulation (PWM) control).

The controller controls the power inverter via the PWM Generator and switch driver so that the power converter outputs the desired multi-phase AC power to the stator windings of motor. Thus, during operation of the synchronous motor, the power converter converts DC power from the power source into multi-phase AC power and supplies such multi-phase AC power to stator windings of the motor, creating a rotating magnetic field that interacts with the rotor's magnetic field to create torque. Thus, proper control of the power converter during normal operation, as a function of rotor position/speed, is necessary to generate a rotating magnetic field that results in efficient motor function, particularly for a variable speed drive system.

A synchronous AC motor drive system of the type described about typically utilizes rotor position sensors to provide information regarding the position and speed of the motor's rotor with respect to the motor's stator windings. Such positional information allows for proper conversion of power that is supplied to the stator windings. Rotor position sensors, however, can be unreliable due to mechanism alignment and temperature incompatibility problems. Moreover, the rotor position sensors can be difficult to mount to the motor during motor assembly, especially for multi-pole motors.

Motor drive systems without rotor position sensors ("speed sensorless" motor drive systems) have become increasingly popular in industrial and aerospace applications due to their low cost and high reliability operation, especially at high speed. Some of the sensorless algorithms, such as Instantaneous Power-Floating Frame Control described in U.S. patent application Ser. No. 10/862,960, filed Jun. 8, 2004, estimate rotor position based on the output voltage of the current loop proportional integral (PI) regulators instead of using measured motor terminal voltage and current signals, which makes the estimated speed more robust to the measurement noise.

Both speed sensorless and sensor-based motor drive systems should respond to fault conditions, such as motor over speed, motor over current and converter DC bus over voltage, . . . etc., even when such fault conditions are transient. Typically, electrical contactors between the power converter and the motor are opened and IGBT gating is disabled upon detecting such non-critical fault conditions, thereby causing the motor rotor to decelerate. If the fault is cleared and the motor rotor still has sufficient speed, the motor drive system will attempt to rerun (i.e., a flying run), which requires closing the electrical contactors, enabling IGBT gating, and resynchronizing. If the motor speed drops below a certain level before the fault is cleared, complete shut-down is required before restart. A new restart will require to go through a full "soft-start" process.

In a speed sensorless system, system operation is necessary to derive motor position/speed information, which makes it difficult to achieve fault tolerance control and flying run operations. Because such systems will lose rotor position information, it is difficult to achieve resynchronization after a temporary shut down.

SUMMARY OF THE INVENTION

In one respect, the present invention is a method of controlling a power converter of a motor drive system, the method comprising: controlling the power converter during a first operating mode by applying a current loop control scheme, which sets power converter commands to control active and reactive current flowing from the power converter to the motor to achieve desired motor speed; and executing a fault protection scheme during a second operating mode, the fault protection scheme generating power converter commands to reduce the active current component flowing from the power converter to the motor to substantially zero.

In another respect, the present invention is a power converter controlling apparatus for controlling a power converter of a synchronous machine drive system, the controlling apparatus comprising: a current controller for generating power converter command signals by: controlling the power converter during a first operating mode by applying a current control scheme, which sets power converter commands to control active and reactive current flowing from the power converter to the motor to achieve desired motor speed; and executing a fault protection scheme during a second operating mode, the fault protection scheme generating power converter commands to reduce the active current component flowing from the power converter to the motor to substantially zero.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

As described in detail below, the present invention provides power conversion control in a motor drive system that achieves effective fault protection by selectively reducing active current flowing between the converter and the motor to substantially zero. In one implementation, this maintains motor synchronization during fault protection mode and facilitates a flying run restart.

U.S. application Ser. No. 10/862,960 ("the '960 application") titled "Instantaneous Power Floating Frame Controller," is incorporated herein by reference in its entirety. The '960 application discloses a speed sensorless motor drive system that estimates rotor position/speed based on current control loop output voltages and executes floating frame control using a reference frame that is synchronized with rotor position/speed based on vector control. In such a system, instantaneous power, including imaginary power (Q) and real power (P), is calculated based on control loop output voltages and used to determine rotor position/speed. The synchronized reference frame is used to control a power converter.

An embodiment of the present invention is described herein in which a fault protection scheme in accordance with principles of the present invention is applied to such a system. It should be recognized, however, that principles of the present invention may be applied to other speed sensorless, as well as sensor-based, motor drive systems. The zero current mode control technique, described herein in one implementation, sets a current reference value to zero instead of shutting down the system during fault protection and motor decelerating. In this way, when applied to a motor drive system such as that disclosed in the '960 application, the output voltage of the current control loop is still effective; therefore, the rotor position can still be estimated and synchronization can be maintained. Therefore, no resynchronization process is required because the motor is still synchronized during this period of time.

Figure 1:
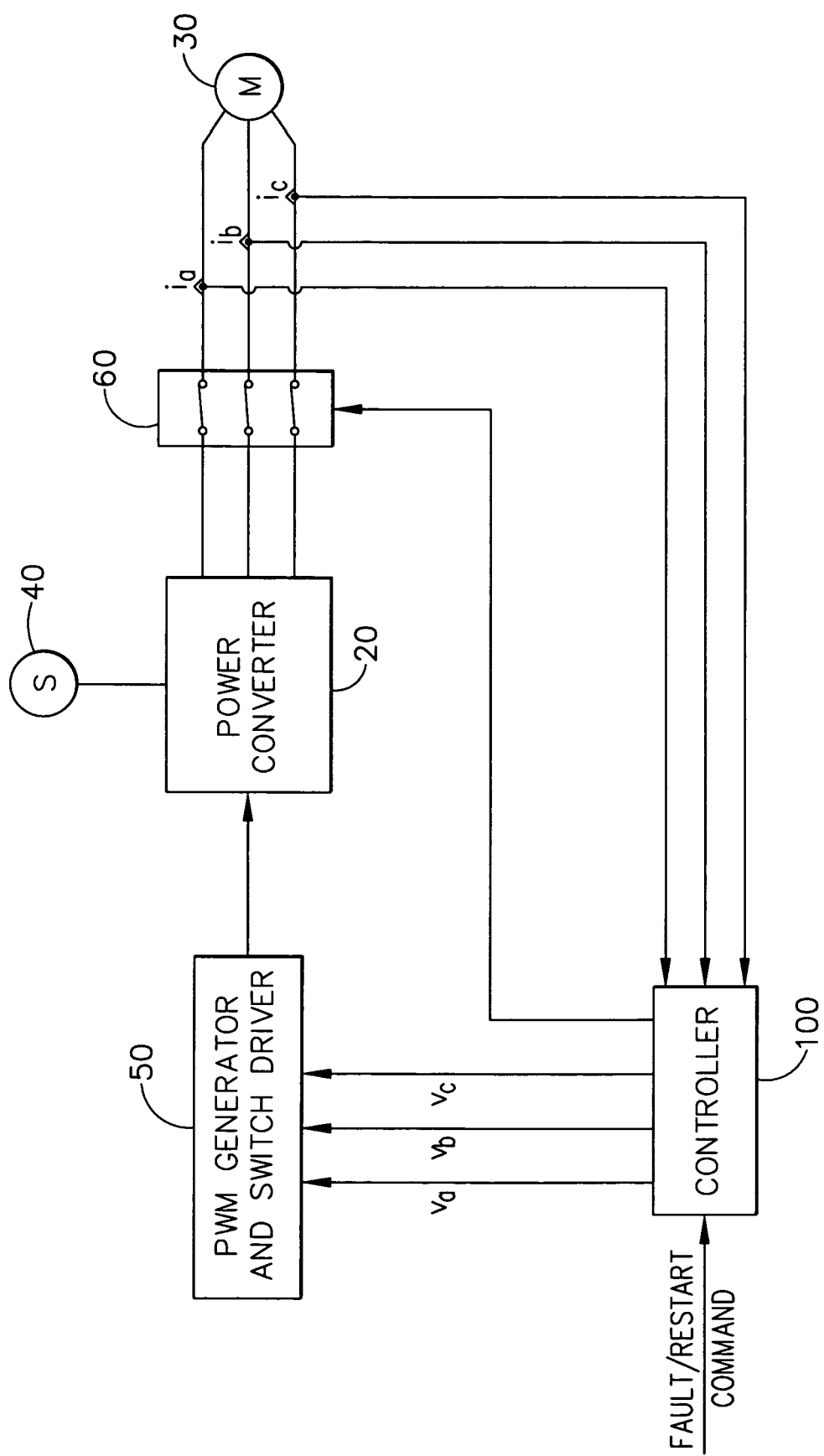
FIG. 1 illustrates a machine drive system to which principles of the present invention may be applied to control power conversion and achieve effective fault protection in accordance with an embodiment of the present invention.

FIG. 1 illustrates a speed sensorless motor drive system 10 to which principles of the present invention may be applied to implement a fault protection. The speed sensorless motor drive system 10 includes the following main components: a synchronous motor 30; a multi-phase power converter 20; a power source 40; a PWM (Pulse Width Modulation) Generator and switch driver 50; electrical contactors 60; and a controller 100. The synchronous motor 30 may be a three-phase permanent magnet synchronous motor (PMSM), although principles of the present invention are not limited to such an environment (e.g., applicable to an induction motor). The power converter 20 may be an inverter for converting DC power from power source 40 into three-phase AC power, e.g., utilizing a configuration of insulated-gate bipolar transistors (IGBTs) under control of the PWM Generator and switch driver 50 (pulse width modulation (PWM) control). Variations on this system are possible. For example, some motor drive systems do not have the AC contactors between power converter and motor. Instead, these systems use DC contactors between power source and the converter. Some other systems have both AC contactors and DC contactors.

The controller 100 controls the power converter 20 via the PWM Generator and switch driver 50 so that the power converter 20 outputs the desired multi-phase AC power to the stator windings of motor 30. Thus, during normal operation of the synchronous motor 30, the power converter 20 converts DC power from the power source 40 into multi-phase AC power and supplies such multi-phase AC power to stator windings of the motor 30, creating a rotating magnetic field that interacts with the rotor's magnetic field to create torque. Thus, proper control of the power converter 20 during normal operation, as a function of rotor position/speed, generates a rotating magnetic field that results in efficient motor function, particularly for a variable speed drive system.

The controller 100 also initiates a fault protection scheme upon receiving a fault indication signal. Fault conditions can be motor over-speed, motor over-current, or power converter DC bus over-voltage, . . . etc. A fault detection/annunciation logic inside the controller 100 may set the FAULT signal to indicate fault condition. The FAULT signal will be reset and a restart command may be sent by the logic if the detected fault condition disappears. This fault protection scheme will be described below with reference to FIGS. 4-5.

Figure 2:
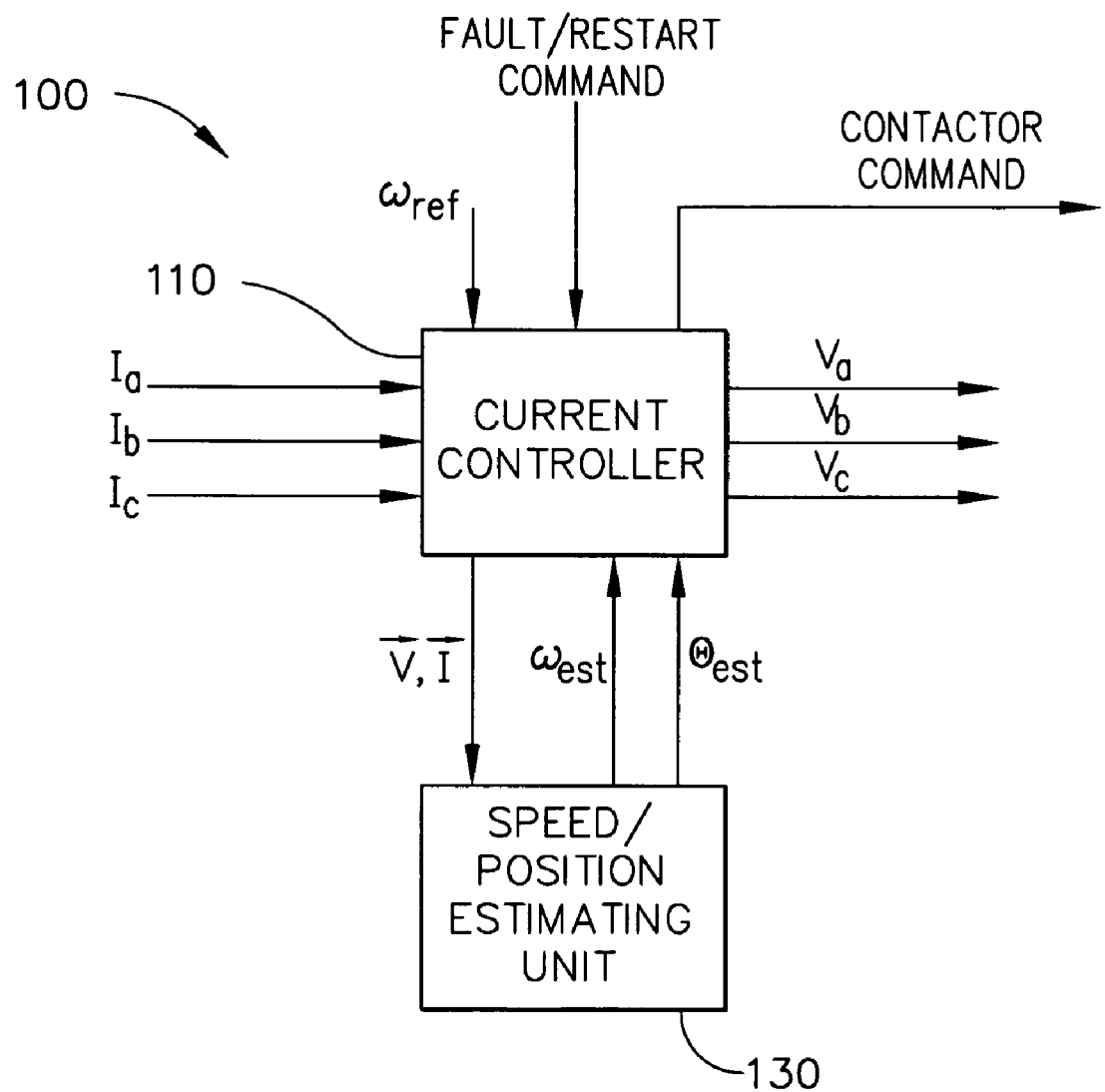
FIG. 2 is a general block diagram of a power conversion controller to which principles of the present invention may be applied to implement a fault protection scheme.

FIG. 2 is a block diagram illustrating elements of the controller 100 in which principles of the present invention may be applied to implement a fault protection scheme according to an embodiment of the present invention. In the embodiment of FIG. 2, the controller 100 includes: a current controller 110 for producing voltage commands ($V_a$, $V_b$, and $V_c$); and a speed/position estimating unit 130 for generating a speed estimate $\omega_{est}$, and a position estimate $\theta_{est}$. Although the current controller 110 and the speed/position estimating unit 130 are shown as discrete elements, it should be recognized that this illustration is for ease of explanation and that the functions of these elements may be combined in the same physical element, e.g., in the same microcontroller or in one or more application-specific integrated circuits (ASIC). In an alternative implementation, the current controller 110 may receive sensor-based values for rotor speed and position. The current controller 110 may, depending on the length of a fault condition, initiate firm shut down by opening the electrical contactors 60.

Figure 3:
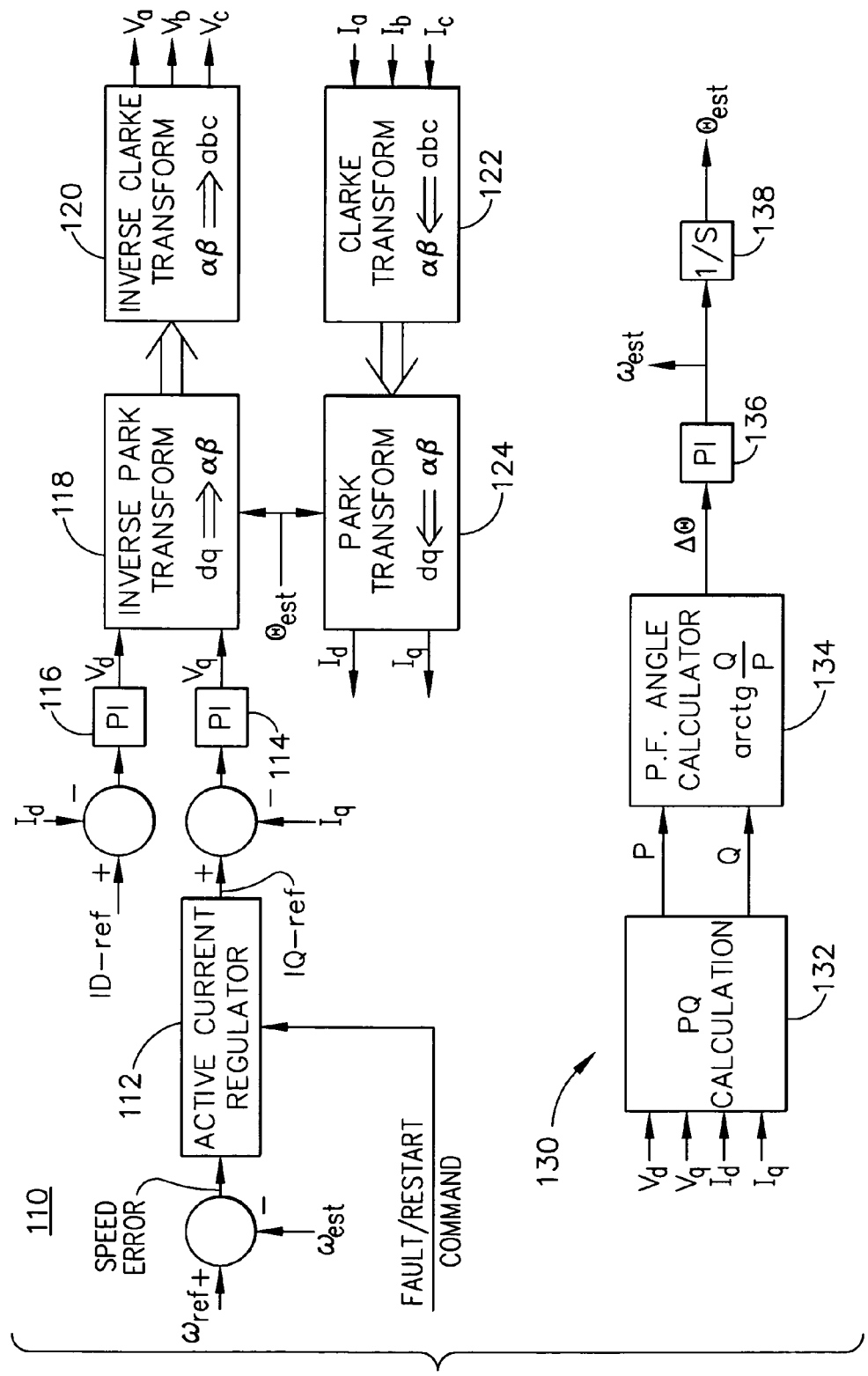
FIG. 3 is a block diagram illustrating, in greater detail, functional elements of the power conversion controller of FIG. 2 suitable for implementing a fault protection scheme in accordance with an embodiment of the present invention.

FIG. 3 is a block diagram illustrating functional components of the current controller 110 and the speed/position estimating unit 130 in greater detail, in accordance with one embodiment of the present invetion. In the embodiment illustrated in FIG. 3, the controller 110 includes a Clarke transform unit 122 for transforming multi-phase line current values $I_a$, $I_b$, $I_c$ into direct and quadrature components of a stationary stator frame $\alpha$, $\beta$; a Park transform unit 124 for calculating rotating reference frame quantities $I_q$ and $I_d$; a reactive current proportional integral (PI) controller 116 for generating a voltage reference $V_d$ as a function of $I_d$; an active current regulator 112, which in normal operating mode generates a torque current reference, $I_q$-ref, based on the difference between a speed command $\omega_{ref}$ and estimated rotor speed $\omega_{est}$; a torque current PI controller 114 for generating a quadrature component voltage reference $V_q$ for torque control; an inverse Park transform unit 118 for transforming voltage references $V_d$ and $V_q$ into $\alpha$ $\beta$ quantities; and an inverse Clarke transform unit 120 for transforming the $\alpha$ $\beta$ quantities into three-phase voltage commands $V_a$, $V_b$, and $V_c$. It will be recognized that the configuration of the current controller 110 is consistent with a conventional arrangement for vector control of a PMSM.

The speed/position estimating unit 130 includes an instantaneous power calculation unit 132; a power factor angle calculator unit 134 for calculating the power factor angle; a speed estimating PI controller 136 for calculating estimated speed $\omega_{est}$ based on the power factor angle; and an integrator 138 for calculating position $\theta_{est}$ based on estimated speed $\omega_{est}$. Operation of the speed/position estimating unit 130 is described in detail in the '960 application.

Figure 4:
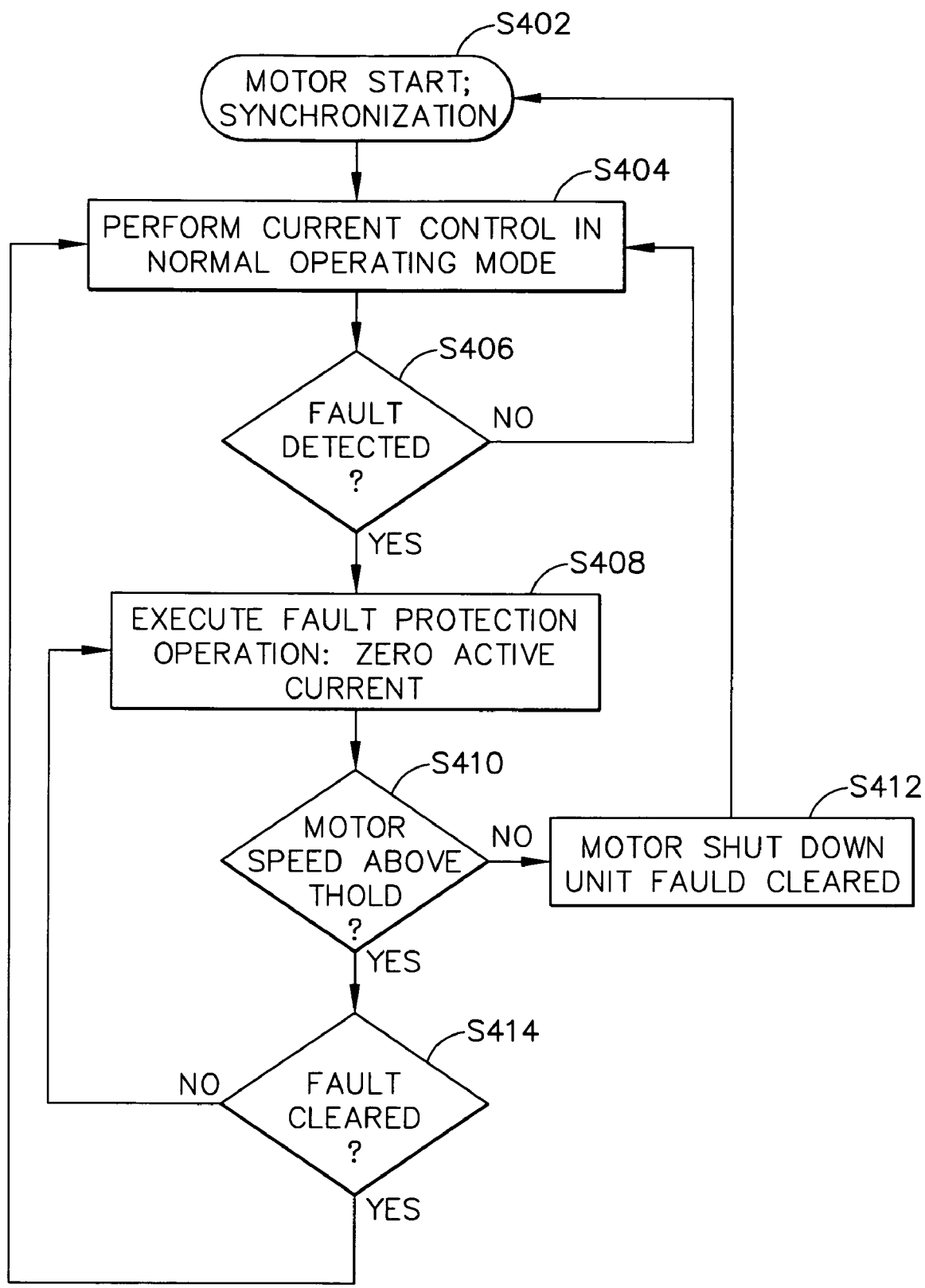
FIG. 4 is a flow diagram illustrating a motor drive control method including a fault protection scheme for a motor drive system in accordance with an embodiment of the present invention.

Operation of the controller 100 during a normal (non-fault) operating mode and a fault protection operating mode will next be described, with reference to the flow diagram of FIG. 4.

Non-Fault Mode

After the motor drive system of FIG. 1 is started and synchronization is achieved (S402), the controller performs current control in accordance with a normal operating mode (S404). In the implementation of FIG. 3, both estimated speed $\omega_{est}$ and position $\theta_{est}$, or sensor-based values for rotor speed and position, are fed into the current controller 110, which performs vector control to generate voltage commands $V_a$, $V_b$, $V_c$.

More specifically, multi-phase line current values $I_a$, $I_b$, and $I_c$ are obtained and fed into the Clarke transform unit 122, which calculates stationary reference frame values $I_\alpha$, $I_\beta$ by calculating:

$$I_\alpha = \frac{1}{3}(2I_a - I_b - I_c)$$

$$I_\beta = \frac{\sqrt{3}}{3}(I_b - I_c).$$

Next, the Park transform unit 124 calculates rotating reference frame values $I_d$ and $I_q$ by calculating:

$$I_d = I_\alpha \cos\theta_{est} + I_\beta \sin\theta_{est}$$

$$I_q = -I_\alpha \sin\theta_{est} + I_\beta \cos\theta_{est}$$

The difference between $I_d$ and a reference value, $I_d$-ref, is input to the reactive current PI controller 116 to generate a voltage reference $V_d$ to minimize such an error (i.e., closed-loop control). During normal operation, the active current regulator 112 generates $I_q$-ref based on the difference between a speed command value $\omega_{ref}$ and the estimated rotor speed $\omega_{est}$. The torque current PI controller 114 generates voltage reference $V_q$ as a function of the difference between $I_q$ and $I_q$-ref. The inverse Park transform unit 118 converts $V_d$ and $V_q$ into the stationary frame $V_\alpha$ and $V_\beta$ by calculating:

$$V_\alpha = V_d \cos\theta_{est} - V_q \sin\theta_{est}$$

$$V_\beta = V_d \sin\theta_{est} + V_q \cos\theta_{est}$$

The inverse Clarke transform unit 120 performs an inverse Clarke transform to generate command voltages $V_a$, $V_b$, and $V_c$.

$$V_a = V_\alpha$$

$$V_b = -\frac{1}{2}(V_\alpha - \sqrt{3}V_\beta)$$

$$V_c = -\frac{1}{2}(V_\alpha + \sqrt{3}V_\beta)$$

Fault Protection Mode

When a fault is detected during the normal operating mode (S406), the controller 100 initiates a fault protection operation (S408), which according to the present invention reduces active current flowing from the power converter 20 to the motor 30 to substantially zero.

With reference to the embodiment of FIG. 3, the active current regulator 112 sets $I_q$-ref to zero during the fault protection mode, thereby achieving substantially zero active current. During fault protection mode, $I_d$-ref is controlled normally, such that there may be reactive current flowing between the power converter 20 and the motor 30. Because rotor position/speed calculation is a function of the current loop PI regulator outputs in the above-described system, the signals for deriving rotor position and speed information are maintained. Thus, an embodiment of the present invention enables sensorless rotor position estimation after fault protection has been initiated. During this period of time the motor is still synchronized. If the fault is still there (i.e., no restart command) after a certain period of time, for example before motor speed drops below a threshold level (S410), the system will be shut down (S412). At this time, the controller 100 may open the contactors 60.

If the fault is cleared (i.e., a restart command is received) before shut down is required (S414), the system will resume normal operation. Because synchronization is maintained, and power converter gating is not disabled, during the fault protection mode, a flying-run resumption of normal operation is facilitated.

Figure 5:
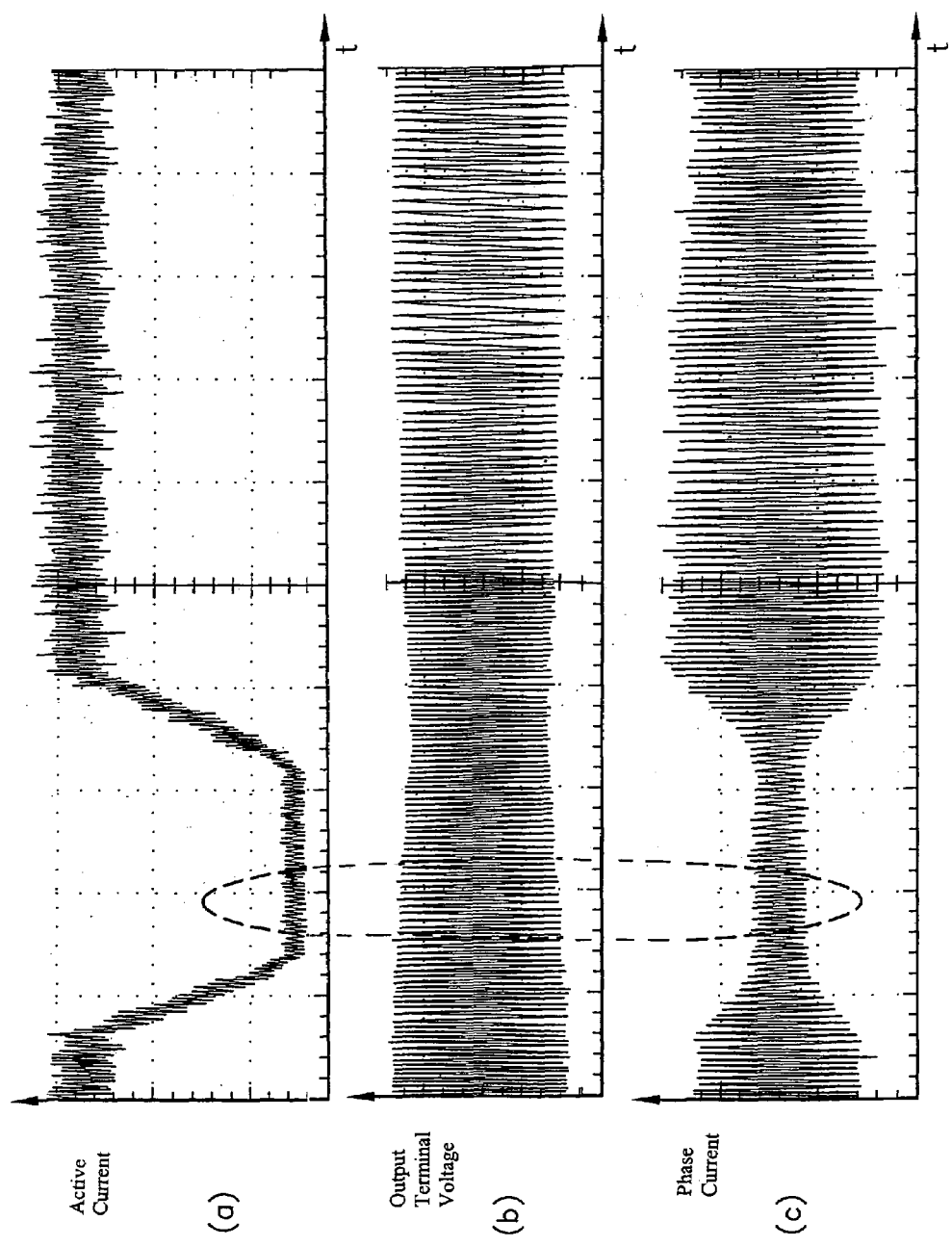
FIG. 5 illustrates exemplary electrical voltage/current waveforms for a fault protection scheme in accordance with an implementation of the present invention.

FIG. 5 illustrates a series of waveforms associated with a fault protection scheme in accordance with an implementation of the present invention. These waveforms show a complete flying-run process. Initially, the motor is running at high speed, e.g., 28,000 rpm, and the controller 100 receives a "zero current mode" command due to any detected transient/fault. As shown in waveform (a), the active current quickly drops to substantially zero, which causes the motor output terminal voltage amplitude (waveform (b)) to gradually decrease, indicating that the motor is gradually decelerating. As shown in waveform (c), the phase current flowing from the power converter to the motor may be non-zero during fault protection due to the reactive current component. Once the fault is cleared, the motor speed (proportional to the amplitude in waveform (b)) increases to resume its pre-fault speed based on the active current being restored.

What is claimed is:

1. A method of controlling a power converter of a motor drive system, said method comprising:

controlling said power converter during a first operating mode by applying a current control scheme, which sets power converter commands to control an active current component flowing from said power converter to a motor to achieve commanded motor speed; and executing a fault protection scheme during a second operating mode, said fault protection scheme generating power converter commands setting an active current component reference, which is compared to a calculated active current component value to generate multi-phase motor voltage commands, to a minimal constant value to reduce the active current component flowing from said power converter to said motor to substantially zero while maintaining a reactive current component flowing from said power converter to said motor, wherein said fault protection scheme is executed during at least one of motor over-speed, motor over-current, and power converter DC bus over-voltage conditions.

2. The method according to claim 1, wherein said fault protection scheme, by reducing active current flowing from said power converter to said motor to substantially zero, causes said motor to decelerate.

3. The method according to claim 1, wherein said power converter is an inverter, which includes a plurality of switching elements that are gated ON/OFF based on gating signals, wherein gating of said switching elements is performed in both said first operating mode and said second operating mode.

4. The method according to claim 1, wherein said motor drive system includes electrical contactors between a power supply and said motor, wherein said electrical contactors remain closed during said second operating mode.

5. The method according to claim 1, further comprising: re-initiating said first operating mode upon receiving a restart command.

6. The method according to claim 5, wherein, after said first operating mode is re-initiated, said controlling step restores active current flowing from said power converter to said motor, without requiring motor resynchronization.

7. The method according to claim 1, further comprising: initiating motor shut down when a restart command is not received during said second operating mode.

8. The method according to claim 7, wherein said power converter is an inverter, which includes a plurality of switching elements that are gated ON/OFF based on gating signals, wherein gating of said switching elements is disabled upon initiating motor shut down.

9. The method according to claim 7, wherein said motor drive system includes electrical contactors between a power supply and said motor, wherein said electrical contactors are opened upon initiating motor shut down.

10. The method according to claim 1, wherein said motor drive system is a speed sensor-less system, which derives rotor position for use in said current control scheme.

11. The method according to claim 10, wherein, during said second operating mode, signals for deriving rotor position are maintained.

12. The method according to claim 1, wherein said motor drive system is a sensor-based system, which utilizes a speed sensor signal for said current control scheme.

13. The method according to claim 1, wherein said motor is an AC synchronous motor or an induction motor.

14. The method according to claim 1, wherein said current control scheme performs floating frame vector control or synchronous frame vector control.

15. The method according to claim 1, wherein said motor drive system is an aerospace motor drive system.

16. A power converter controlling apparatus for controlling a power converter of a synchronous machine drive system, said controlling apparatus comprising:
a current controller for generating power converter command signals by:
controlling said power converter during a first operating mode by applying a current loop control scheme, which sets power converter commands setting an active current component reference, which is compared to a calculated active current component value to generate multi-phase motor voltage commands, to a minimal constant value to control an active current component flowing from said power converter to a motor to achieve commanded motor speed; and executing a fault protection scheme during a second operating mode, said fault protection scheme generating power converter commands to reduce the active current component flowing from said power converter to said motor to substantially zero while maintaining a reactive current component flowing from said power converter to said motor,
wherein said fault protection scheme is executed during at least one of motor over-speed, motor over-current, and power converter DC bus over-voltage conditions.

17. The apparatus according to claim 16, wherein said fault protection scheme, by reducing active current flowing from said power converter to said motor to substantially zero, causes said motor to decelerate.

18. The apparatus according to claim 16, wherein said power converter is an inverter, which includes a plurality of switching elements that are gated ON/OFF based on gating signals, wherein gating of said switching elements is performed in both said first operating mode and said second operating mode.

19. The apparatus according to claim 16, wherein said motor drive system includes electrical contactors between a power supply and said motor, wherein said electrical contactors remain closed during said second operating mode.

20. The apparatus according to claim 16, wherein said current controller re-initiates said first operating mode upon receiving a restart command.

21. The apparatus according to claim 20, wherein, after said first operating mode is re-initiated, said current controller restores active current flowing from said power converter to said motor, without requiring motor resynchronization.

22. The apparatus according to claim 16, wherein said current controller initiates motor shut down when a restart command is not received during said second operating mode.

23. The apparatus according to claim 22, wherein said power converter is an inverter, which includes a plurality of switching elements that are gated ON/OFF based on gating signals, wherein gating of said switching elements is disabled upon initiating motor shut down.

24. The apparatus according to claim 22, wherein said motor drive system includes electrical contactors between a power supply and said motor, wherein said electrical contactors are opened upon initiating motor shut down.

25. The apparatus according to claim 16, wherein said motor drive system is a speed sensor-less system, which derives rotor position for use in said current loop control scheme.

26. The apparatus according to claim 25, wherein, during said second operating mode, said current controller maintains signals for deriving rotor position.

27. The apparatus according to claim 16, wherein said motor drive system is a sensor-based system which utilizes a speed sensor signal for said current loop control scheme.

28. The apparatus according to claim 16, wherein said motor is an AC synchronous motor or an induction motor.

29. The apparatus according to claim 16, wherein said current controller performs floating frame or synchronous frame vector control.

30. The apparatus according to claim 16, wherein said motor drive system is an aerospace motor drive system.

* * * * *